(12) United States Patent
Clark et al.

(10) Patent No.: US 7,480,597 B2
(45) Date of Patent: Jan. 20, 2009

(54) METHOD, SYSTEM AND STORAGE MEDIUM FOR GENERATING VIRTUAL BRICK MODELS

(75) Inventors: Tomas Clark, New York, NY (US); Brad Justus, New York, NY (US); Jacob McKee, Enfield, CT (US); Ronny Scherer, Vejle (DK); Russell R. Stoll, Brooklyn, NY (US); Olga Timcenko, Billund (DK); Thomas Scott Wilson, Brooklyn, NY (US)

(73) Assignee: LEGO A/S (DK)

( * ) Notice: Subject to any disclaimer, the term of this patent is extended or adjusted under 35 U.S.C. 154(b) by 914 days.

(21) Appl. No.: 10/441,464

(22) Filed: May 20, 2003

(65) Prior Publication Data

US 2004/0236539 A1 Nov. 25, 2004

(51) Int. Cl.
*G06F 7/60* (2006.01)
*G06F 17/00* (2006.01)
*G06F 19/00* (2006.01)
*G06Q 10/00* (2006.01)

(52) U.S. Cl. .............................. 703/2; 705/28; 700/97; 700/98; 700/106; 700/107

(58) Field of Classification Search .................. 703/2, 703/7; 705/28; 700/106, 107, 98, 97
See application file for complete search history.

(56) References Cited

U.S. PATENT DOCUMENTS

| | | | |
|---|---|---|---|
| 5,119,307 A * | 6/1992 | Blaha et al. | 700/107 |
| 6,004,021 A * | 12/1999 | Rothbarth | 703/2 |
| 6,526,375 B1 * | 2/2003 | Frankel et al. | 703/21 |
| 2002/0144212 A1 | 10/2002 | Lev et al. | |
| 2002/0165701 A1 | 11/2002 | Lichtenberg et al. | |
| 2002/0165805 A1 * | 11/2002 | Varga et al. | 705/28 |
| 2003/0182256 A1 * | 9/2003 | Otey | 707/1 |
| 2003/0225772 A1 | 12/2003 | Sykes | |
| 2004/0068485 A1 | 4/2004 | Thompson et al. | |
| 2004/0236539 A1 | 11/2004 | Clark et al. | |

(Continued)

FOREIGN PATENT DOCUMENTS

WO  WO0142969  6/2001

(Continued)

OTHER PUBLICATIONS

Todd Lehman, "Re: Announcing LEGO Digital Designer 1.0", Apr. 30, 2003. http://news.lugnet.com/cad/?n=9835.*

(Continued)

*Primary Examiner*—Paul L Rodriguez
*Assistant Examiner*—Dwin M Craig
(74) *Attorney, Agent, or Firm*—Cantor Colburn LLP (57) ABSTRACT

An exemplary embodiment is a method for generating a virtual brick model. The virtual brick models are generated by users and uploaded to a centralized host system. Users can build virtual models themselves or download and edit another user's virtual brick models while retaining the identity of the original virtual brick model. Routines are provided for both storing user created building steps in and generating automated building instructions for virtual brick models, generating a bill of materials for a virtual brick model and ordering physical bricks corresponding to a virtual brick model.

8 Claims, 6 Drawing Sheets

U.S. PATENT DOCUMENTS

2005/0044133 A1    2/2005    Hashimoto et al.

FOREIGN PATENT DOCUMENTS

| WO | WO0165423 | 9/2001 |
|---|---|---|
| WO | WO2004104811 | 12/2004 |
| WO | WO2005124696 | 12/2005 |

OTHER PUBLICATIONS

"Amazon.com: LEGO Software Power Tools, With LDraw, MLCad, and LPub (Paperback)." Printed on Sep. 11, 2006. http://www.amazon.com/Software-Power-Tools-LDraw-MLCad/dp/1931836760.*

Tim Courtney, "MLCad", LDraw.org :: The Centralized Site for the LDraw Family of LEGO® CAD Software. Written: 1999. Posted: Sep. 12, 2003. Printed: Printed: Sep. 11, 2006. http://www.ldraw.org/modules.php?op=modload&name=Reviews&file=index&req=showcontent&id=4.*

Sebastian Stein, "MLCAD Tutorial", Last Modification: Apr. 12, 2004. http://ww.hpfsc.de/mlcd_tut/tut_eng.html.*

"LEGO Digital Designer: Virtual Building Sofware." © 2006. Printed: Sep. 11, 2006. http://ldd.lego.com.*

"MLCAD from Wikipedia, the free encyclopedia". Last updated: Sep. 6, 2006. Printed: Sep. 11, 2006. http://en.wikipedia.org/wiki/MLCAD.*

Clague, K. et al. LEGO Software Power Tools, With LDraw, MLCad, and LPub. © 2002. pp. ix-xx, 1-12, 39-73, 91-105, 159-171, 187-196, 205-216, and 238-239.*

Microsoft Press Computer User's Dictionary, © 1998. pp. 153, 190-191.*

Courtney, T. et al., "Virtual LEGO, passage", Virtual LEGO, 2003, pp. 75-81, 179, XP002317213, p. 91, p. 232, p. 234.

McDermott, J., "R1: A Rule-Based Configurer of Co9mputer Systems*", Artificial Intelligence, Elsevier Science Publisher B. V., Amsterdam, NL, vol. 19, No .1, Sep. 1, 1982, pp. 39-88, XP000568599, ISSN: 0004-3702, abstract.

International Search Report, PCT/DK2006/000462, 2 pages, Jul. 17, 2007.

* cited by examiner

To build: ROBOT

You need 5 red 2x8 bricks     $1.00
2 yellow 2X2 bricks     $0.35

Total     $1.35

Back     Checkout

METHOD, SYSTEM AND STORAGE MEDIUM FOR GENERATING VIRTUAL BRICK MODELS

BACKGROUND OF THE INVENTION

The invention relates generally to generating brick models and in particular, to generating virtual brick models. Currently, brick models, such as those sold by the LEGO Group of Companies ("LEGO"), are sold to consumers in a number of ways. A consumer typically reviews a description of a brick model (e.g., the packaging for the brick model, a catalog, an e-catalog, an in-store display, etc.) to determine whether the consumer will purchase a brick model. The model may correspond to any item created by bricks. In general, consumers either select a model or models from sets of models defined by the manufacturer or generate their own creative models. The manufacturer's models typically are accompanied by instructions for assembling the model. While the current approach to distributing models is well accepted, the consumer is limited to either purchasing and assembling predefined models generated by a model designer who works for a manufacturer or designing their own models out of materials they have purchased, without assistance from the model designer.

SUMMARY OF THE INVENTION

An exemplary embodiment is a method for generating a virtual brick model. The virtual brick models are generated by users and uploaded to a centralized host system. Users can download and edit virtual brick models while retaining the identity of the original virtual brick model. Routines are provided for generating building instructions for virtual brick models, generating a bill of materials for a virtual brick model and ordering physical bricks corresponding to a virtual brick model.

DETAILED DESCRIPTION OF THE PREFERRED EMBODIMENT

Figure 1:
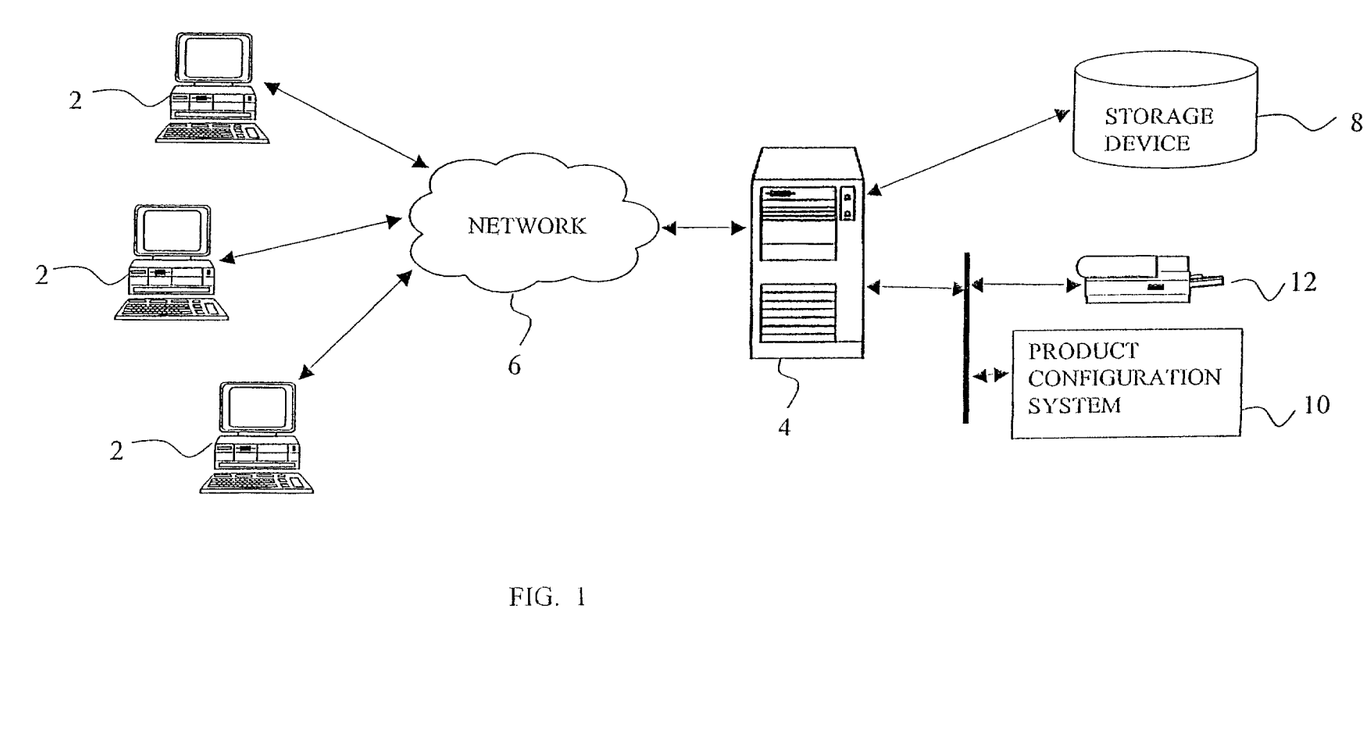
FIG. 1 is a block diagram of an exemplary system for generating a virtual brick model.

FIG. 1 is a block diagram of an exemplary system for generating a virtual brick model. The term "brick" refers to any discrete building item such as toy building elements available from LEGO. Such toy building elements may include coupling studs for frictionally interconnecting the toy building elements. Of course, other coupling or interlocking mechanisms may be used such as ball and socket. The bricks are not necessarily limited to orthogonal shapes, but may have a variety of shapes. The system of FIG. 1 includes user systems 2. Each user system 2 may be implemented using a general-purpose computer executing a computer program for carrying out the processes described herein. The user systems 2 may be personal computers owned by consumers or computers placed in consumer locations such as toy stores, theme parks, etc. User system 2 may also be a mobile device such as a phone or handheld, a game console such as a Sony Playstation or Nintendo GameCube, or other digital device with a display, controls, and a network or wireless connection.

A host system 4 is in communication with the user systems 2 through network 6. The host system 4 may be implemented using existing servers and executes a computer program for carrying out the processes described herein. Host system 4 serves as a central location for virtual brick models, enables uploading and downloading of virtual brick models and initiates distributing physical bricks based on a virtual brick model.

The network 6 may be any type of known network including a local area network (LAN), wide area network (WAN), global network (e.g., Internet), intranet, etc. The user system 2 may be coupled to the host system 4 through multiple networks (e.g., intranet and Internet) so that not all user systems 2 are coupled to the host system 4 via the same network. One or both of the user systems 2 and the host system 4 may be connected to the network 6 in a wireless fashion and network 6 may be a wireless network. In a preferred embodiment, the network 6 is the Internet and each user system 2 executes a user interface application (e.g., web browser) to contact the host system 4 through the network 6. Alternatively, a user system 2 may be implemented using a device programmed primarily for accessing network 6 such as a remote terminal.

The host system 4 operates as a network server (often referred to as a web server) to communicate with the user systems 2. The host system 4 handles sending and receiving information to and from user systems 2 and can perform associated tasks. The host system 4 may also include a firewall to prevent unauthorized access to the host system 4 and enforce any limitations on authorized access. For instance, an administrator may have access to the entire system and have authority to modify portions of the system. The firewall may be implemented using conventional hardware and/or software as is known in the art.

The host system 4 also operates as an applications server. The host system 4 executes one or more computer programs to coordinate generating, viewing, manipulating, uploading and downloading virtual brick models and ordering physical bricks. The host system 4 also interacts with a product configuration system 10 that coordinates distribution of physical bricks if requested by a user. The system includes a printer 12 that generates printed building instructions that accompany bricks of the physical model as described herein. It is understood that separate servers may be used to implement the network server functions and the applications server functions. Alternatively, the network server, firewall and the applications server can be implemented by a single server executing computer programs to perform the requisite functions.

Storage device 8 may be implemented using a variety of devices for storing electronic information such as a file transfer protocol (FTP) server. It is understood that storage device 8 may be implemented using memory contained in host system 4 or may be a separate physical device. Storage device 8 contains a variety of information including virtual brick models submitted from user systems 2, building instructions for virtual brick models, and physical brick identifiers corresponding to virtual brick models. Storage device 8 may also contain information concerning the submission of a virtual brick model (e.g., a unique virtual brick model identifier, a user identifier, date and time of submission, etc.). In addition, information concerning the delivery of physical bricks and instructions to the user (e.g., brick counts, delivery date and time, shipping address, etc.) may be stored in storage device 8.

Figure 2:
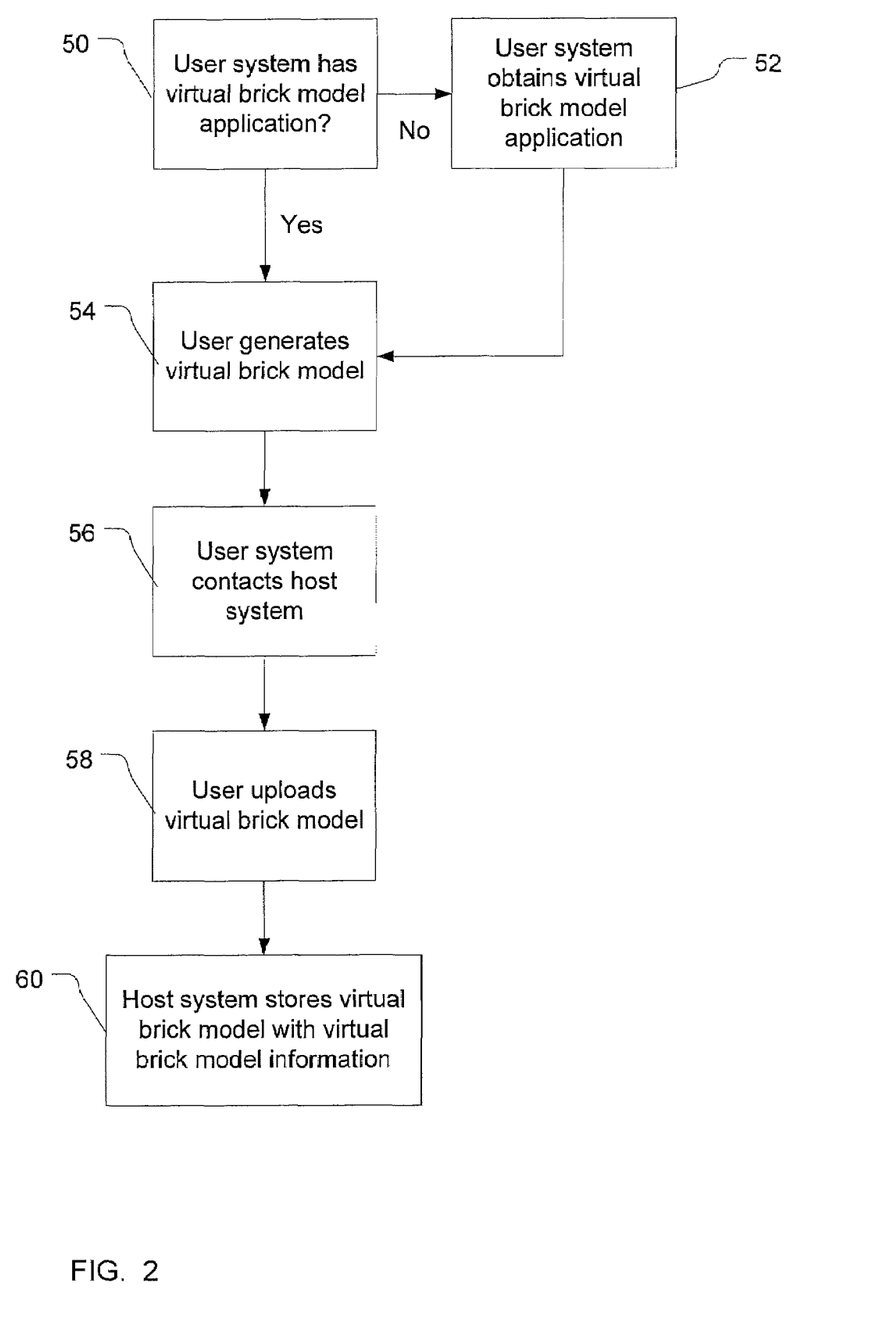
FIG. 2 is a flowchart of an exemplary process for generating a virtual brick model.

Operation of the system will now be described with reference to FIGS. 2-6. The host system 4 serves as a central repository for virtual brick models submitted by users at user systems 2. FIG. 2 is a flowchart of a process for generating a virtual brick model in one embodiment. The process begins at step 50 where it is determined whether the user system 2 includes a virtual brick model application. The virtual brick model application is a software application that allows a user to generate virtual brick models as described in further detail herein.

If the user system 2 lacks the virtual brick model application, the user system 2 contacts the host system 4 over network 6 to download and install the virtual brick model application on the user system 2 at step 52. Existing software routines (e.g., Installshield) are used to install the virtual brick model application on the user system 2. It is understood that downloading the virtual brick model application for installation on the user system is an exemplary embodiment. The virtual brick model application may be installed only on host system 4 and accessed via network 6. The virtual brick model application may be read from a storage medium at the user system such as a floppy disk, CD, etc. Alternatively, processing of the virtual brick model application may be divided among user system 2 and host system 4.

Figure 3:
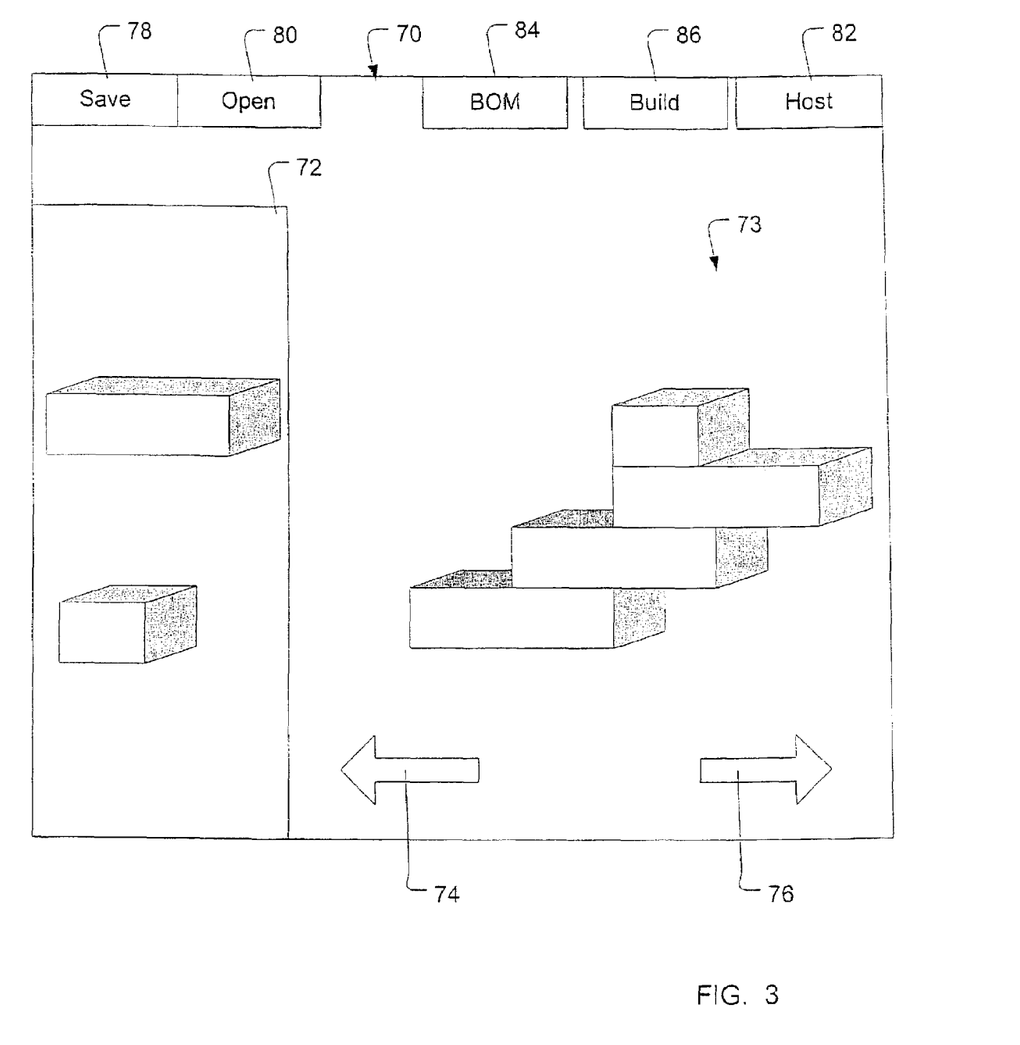
FIG. 3 shows an exemplary user interface for generating a virtual brick model.

At step 54, the user then generates a virtual brick model through a user interface generated by the virtual brick model application at user system 2. FIG. 3 is an exemplary user interface 70 that allows a user to select a virtual representation of a brick from a list of bricks, represented graphically in virtual brick area 72. Using an input device at user system 2 (e.g., mouse, keyboard, trackball, etc.) the user can select bricks from virtual brick area 72 and assemble virtual brick models in virtual building area 73. The bricks do not need to be in contact or connected. Through the input device, the virtual brick model can be rotated through rotation icons 74 and 76. The viewpoint from which the virtual building area 73 is seen may be changed and the point around which rotation and tilting takes place may be changed.

Virtual bricks within the virtual building area 73 may be moved and/or deleted though the input device. Tools may be selected from a tool area (not shown) to allow a user to deconstruct a virtual brick model of connected bricks by clicking on bricks with a tool that causes the bricks to disconnect, fly apart, and/or disappear. Virtual bricks may be moved, adjusted and rotated in ways that physical bricks can. For example, a virtual brick representing a window may be opened or closed. Similarly, hinged virtual bricks may be moved though various angles. A color tool may be selected to allow a user to change the color of the virtual bricks. The available colors may be restricted by whether that color of virtual brick exists in a physical brick. Such a restriction may be disabled by the user.

The user may save virtual brick models on the user system 2 (e.g., a local hard drive) through a save icon 78 or open and edit existing virtual brick models through an open icon 80. When the user saves a virtual brick model on user system 2, the virtual brick model is stored in a compact format. The compact format describes the virtual brick model as a list of virtual bricks placed in three-dimensional space. The compact model may also include graphical data if desired. The compact format also provides positional data for each virtual brick defining where the brick is positioned in a three-dimensional coordinate system.

Connectivity information identifying how the bricks are connected may also be included in the compact format. An exemplary format is described in U.S. Pat. No. 6,389,375, the entire contents of which are incorporated herein by reference. Connectivity of the bricks may be defined using techniques such as those described in U.S. provisional patent application Ser. No. 60/421,034, the entire contents of which are incorporated herein by reference. The virtual brick model application stored on user system 2 includes 3D rendering software that generates a 3D representation of the virtual model (presented on a 2D display) based on the compact format.

A bill of material (BOM) icon 84 launches a BOM routine to determine what commercially available physical bricks or brick sets would be necessary to build the virtual brick model. For example, if the user created a virtual brick model of a rocket-powered car, selecting the BOM icon 84 will run a routine that indicates to the user that purchase of a particular car set and a particular spaceship set will allow the user to build a physical brick model of the virtual brick model. The sets may be based on a theme (e.g., a spaceship) or contain a bulk assortment of bricks. Alternatively, the BOM routine may identify predefined brick packs that are needed to build the virtual brick model. A predefined brick pack may be, for example, a bag of bricks provided by the manufacturer that is used in one or more sets. If either existing sets or brick packs are identified, more physical bricks than necessary to build the virtual brick model are identified. In yet another embodiment, the BOM routine identifies individual physical bricks needed to complete the virtual brick model. The BOM routine may identity a combination of one or more sets, brick packs and individual bricks to build a physical model corresponding to the virtual brick model.

The software application to execute the BOM routine may be executed by the host system 4 which has access to storage device 8 including definitions of pre-existing sets and brick packs. Operation of the BOM routine is as follows. First, either based on the virtual building application's internal data structures or based on an analysis of the virtual model compact format, a list of all the bricks in a model is generated. This list is referred to as a model list.

Second, a group of product lists is obtained, either through the user system 2 or through the host system 4, of products to match against. These product lists provide a list of bricks that can be found in those products. The exact lists that are obtained depends on the application. For an e-commerce application where a user at user system 2 is interested in ordering bricks through host system 4, the group of product lists would be based on what products (e.g., sets, brick packs, individual bricks) are available for fulfillment in the country into which that user indicates they want the products shipped. Another application might be a user wanting to know whether they can build a model with sets they already have in their possession. In this case, the user might define the group of product lists or the contents of individual lists themselves, as it would represent their collection of physical bricks rather than brick sets available for purchase.

A matching algorithm is used to match up the model list against the group of product lists. The matching algorithm goes through each product list one brick at a time, looking for each brick from the model list in the product lists. Instances where a brick is found in a product list are recorded (for example brick A from model list is found in product list 4), and the BOM routine moves on to the next brick in the model list. Once the occurrence of each model brick in each product list is determined, a result indicating which products are needed to build the model is determined. The results may be optimized based on optimization criterion such as the fewest possible products, or the lowest cost to the consumer, or the lowest number of unnecessary bricks (surplus bricks in the products list that are not on the model list), or the lowest time and resources to compute the result.

The results of one or more groups of products needed to provide bricks to build the virtual model are displayed to the user at user system 2. If the user system 2 is in communication with the host system 4, the user is provided the ability to purchase bricks as described in further detail herein.

The BOM process may also be implemented in reverse. In this mode, the user provides a product lists identifying products (e.g., brick sets owned by the user), and a reverse BOM algorithm identifies virtual models that can be made with those products. This allows a user to find out what models can be made with a certain set of products (e.g., products in their personal collection). The virtual models compared to the product list may be those saved on the user system 2 or those stored on storage device 8 associated with host system 4 if the user system 2 is in communication with the host system 4.

Selection of the build icon 86 initiates a building instruction routine that provides for generating building instructions for the virtual brick model. The building instructions may include a series of pictures of the virtual brick model as bricks are added, starting with the first brick and depicting the progress of building the virtual brick model to the last brick. Current physical toy brick sets, such as those from LEGO, utilize similar visual building instructions. The building instructions may be created manually by the user selecting virtual bricks and associating one or more virtual bricks with a step in the building instructions. For example, the user may select three virtual bricks and associate these virtual bricks with step 1. Two more bricks may be associated with step 2 and so forth. The user-defined building instructions may then be saved along with the virtual brick model.

Alternatively, building instructions may be automatically generated for a virtual brick model. To generate the building instructions automatically, the user system 2 accesses the saved description of the virtual brick model and parses the description into one brick or multi-brick groups based on connectivity data in the virtual brick model. The user may override or alter the user system 2 grouping of bricks for each step of the building instructions. For example, bricks may be added to or removed from the computer-generated groupings through a user input device. Each step of the instructions will then depict the addition of each group of bricks. The graphical rendering application can then generate the series of images of the virtual brick model as bricks are added. The automatically generated building instructions may then be saved along with the virtual brick model. The user may then print the building instructions (whether user-defined or automatic) using a printer coupled to the user system 2 (not shown).

Figure 4:
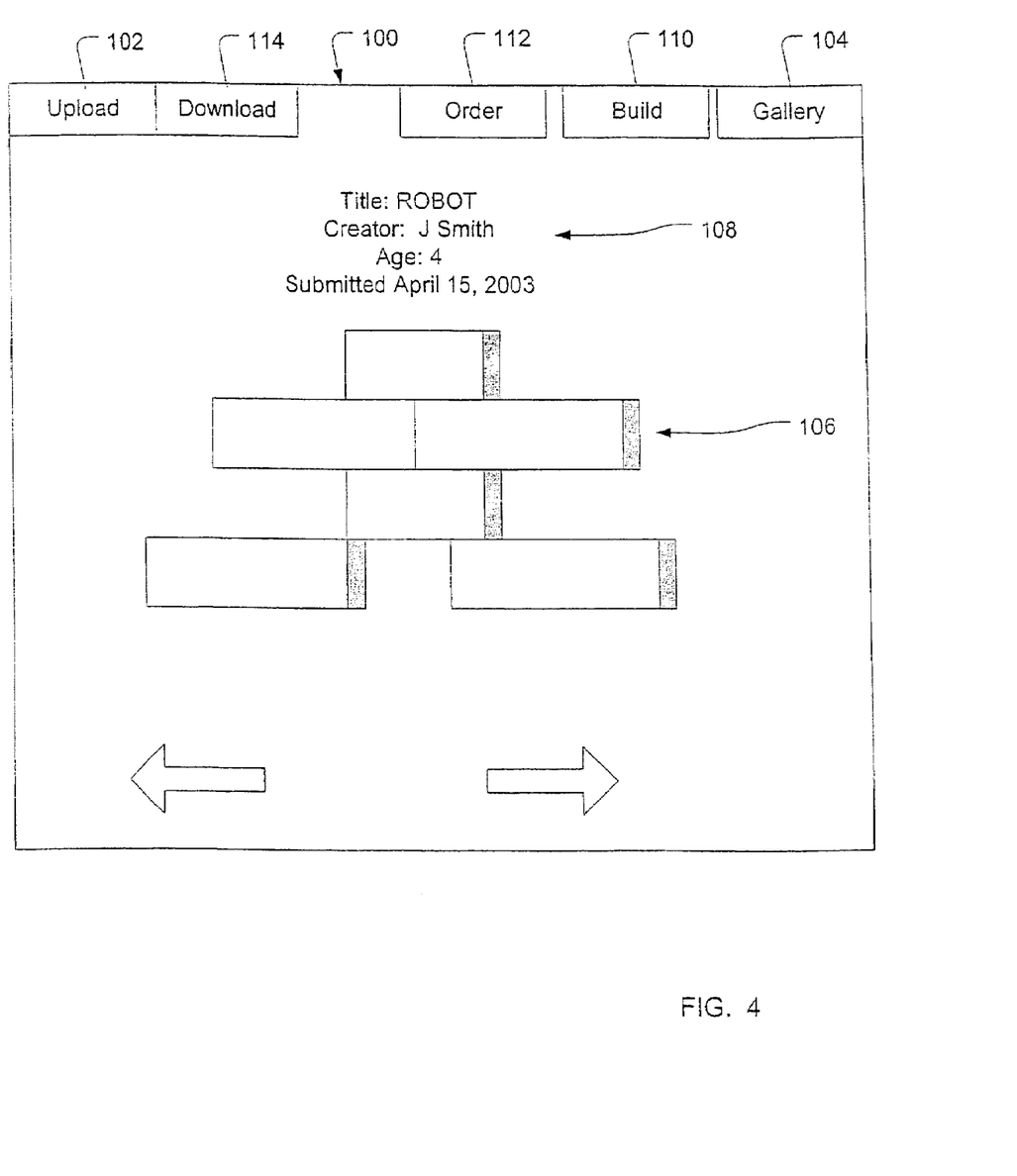
FIG. 4 shows an exemplary user interface for viewing virtual brick models.

Selection of a host icon 82 initiates a communication program to connect the user system 2 with host system 4 via network 6. In an exemplary embodiment, the communication program is a web browser which directs the user systems 2 to a web page maintained by host system 4. FIG. 4 shows an exemplary user interface 100 provided by host system 4. The user interface 100 includes an upload icon 102, which upon selection, prompts the user to select a virtual brick model on user system 2 for upload to the host system 4. The virtual brick model is accompanied by virtual brick model information such as user identifier (actual name or pseudonym) of the creator, title of the virtual brick model, age of the user, etc. Building instructions, if created, are also stored along with the virtual brick model. The host system 4 stores the virtual brick model along with the virtual brick model information in storage device 8. A virtual brick model identifier is also generated by host system 4, assigned to the virtual brick model and saved. This allows an original virtual brick model to be acknowledged as virtual brick models are edited as described in further detail below. The host system 4 also time stamps the virtual brick model with a date and optionally a time of upload. The uploaded virtual brick models are referred to as the gallery. The host system 4 stores the virtual brick model in the compact format as described above and includes a rendering application to generate a 3D display of the virtual brick model.

From the user system 2, a user can view virtual brick models in the gallery by selecting the gallery icon 104. The host system 4 retrieves virtual brick models stored in the storage device 8 along with the virtual brick model information. FIG. 4 shows a virtual brick model 106 along with virtual brick model information 108. The user can rotate the virtual brick model 106 and tilt the viewing angle through various icons in user interface 100.

The user can select a build icon 110 to view or generate building instructions for the virtual brick model. If building instructions exist, the building instructions are retrieved and presented to the user system 2. If building instructions are not associated with the virtual brick model, the user is given the option to manually generate building instructions or have the host system 4 automatically generate building instructions as described above. Alternatively, the user can download the virtual brick model to the user system 2, generate the building instructions locally at user system 2 and upload the virtual brick model and building instructions to host system 4. The user may add building instructions to their own virtual brick models or virtual brick models created by others. The building instructions may then be saved on storage device 8 along with the virtual brick model. The building instructions may also be printed on a printer coupled to user system 2.

Figure 5:
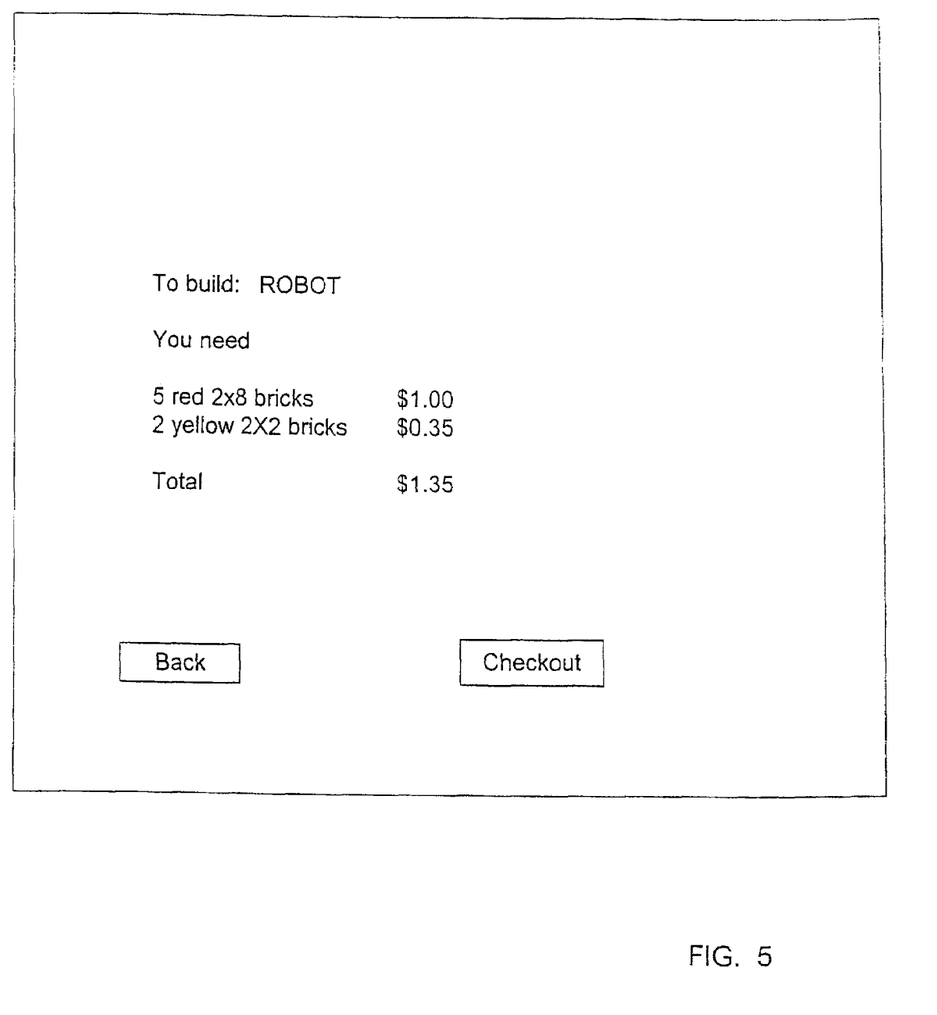
FIG. 5 shows an exemplary user interface for ordering physical bricks corresponding to a virtual brick model.

Selecting the BOM icon 112 causes the host system 4 to execute the BOM routine as described above and execute an ordering routine. Depending on the BOM routine, the host system 4 identifies which existing sets, brick packs and/or individual bricks are needed to build the virtual brick model along with a cost. When the user system 2 is connected to the host system 4, the BOM routine also allows the user to order the bricks. FIG. 5 depicts an exemplary order user interface providing the number and types of bricks along with the cost. The user can return to the gallery by choosing "back" or purchase the bricks by selecting "checkout." If the user selects checkout, the host system 4 executes a checkout process collecting the user name, billing address, shipping address, payment method, etc. as known in the art.

Once the user has entered the information needed for checkout, the host system 4 provides the product configuration system 10 with a bill of materials determined from the ordered virtual brick model. The host system 4 may also generate an order identifier and provide the order identifier to the product configuration system 10. The product configuration system 10 initiates selection of the appropriate items from storage through automated brick selection apparatus (not shown). Depending on the BOM routine, the order may be filled using predefined building sets (e.g., one rocketship set with one dragster set), brick packs, individual bricks or combinations of these elements to physically build the virtual brick model.

If building instructions are already saved with the virtual brick model, the building instructions may be sent to printer 12 by host system 4. If building instructions do not exist, the building instructions may be generated by the host system 4 executing the building instruction routine as described above. Virtual brick model information (e.g., creator, title, etc.) may be included as part of the building instructions. The host system 4 sends the building instructions to printer 12. The shipping name and shipping address may also be routed to printer 12 to generate a shipping label. The bricks, building instructions and optionally a bill of materials are packaged and provided to the shipping address.

The gallery of virtual brick models stored on storage device 8 allows users to review virtual brick models submitted by other users and order physical bricks in order to construct these virtual brick models. A user at user system 2 may also download virtual brick models for storage on user system 2 and editing. Referring to FIG. 4, if the user selects the download icon 114, the virtual brick model from the gallery will be saved on the user system 2. When a virtual brick model is downloaded, the virtual brick model identifier is included with the virtual brick model file. If that file is then uploaded by another user (e.g., edited by the second user) host system 4 recognizes the first virtual brick model identifier and generates a second virtual brick model identifier to be saved with the second virtual brick model.

Thus, even as virtual brick models are downloaded, edited and uploaded, the host system recognizes the author of original virtual brick model as well as the new author of the edited virtual brick model. Multiple virtual brick model identifiers may be associated with a virtual brick model so that the history of the virtual brick model can be retrieved. Further, users can associate building instructions with their own virtual brick models or virtual brick models created by others as described above.

Figure 6:
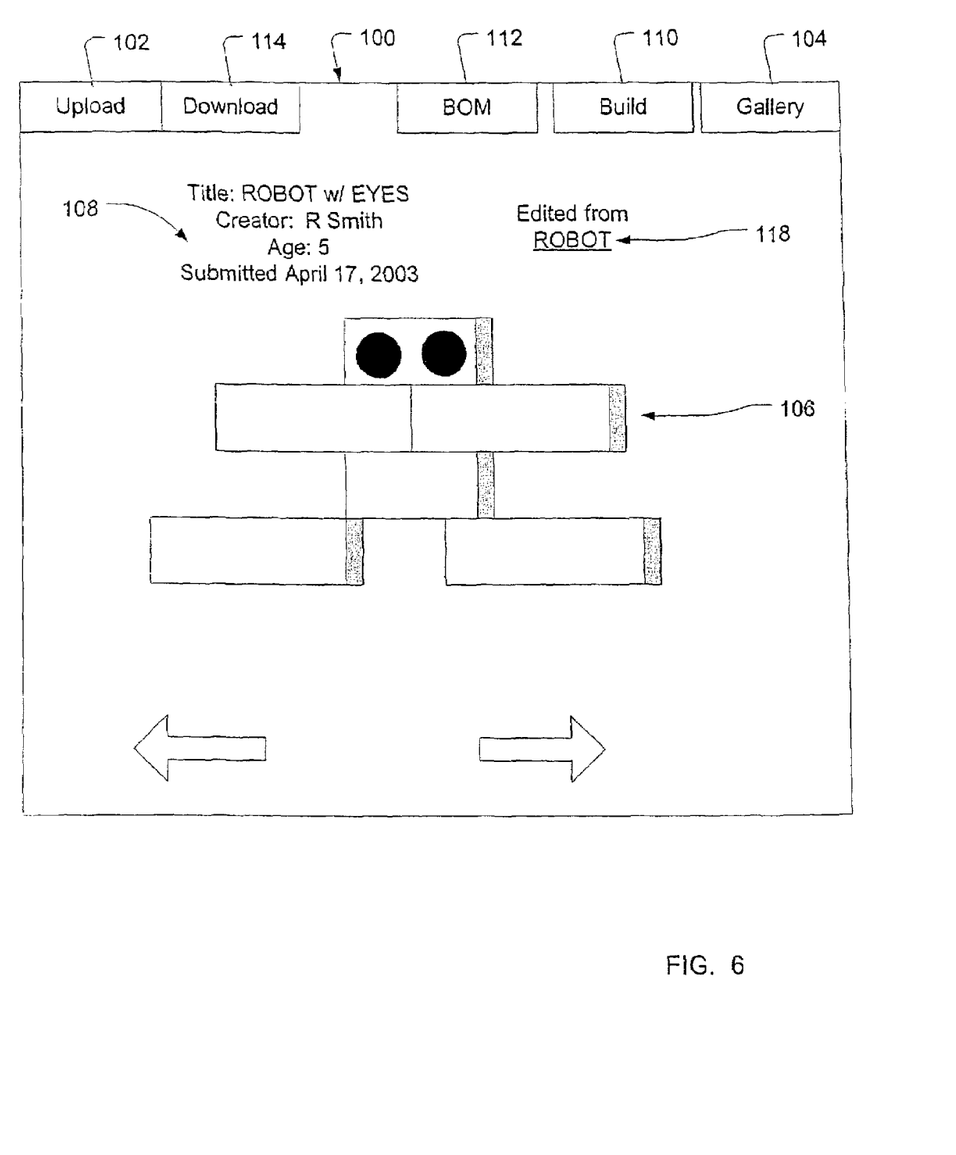
FIG. 6 shows an exemplary user interface for viewing virtual brick models.

FIG. 6 shows an exemplary virtual brick model that has been edited. The virtual brick model information 108 is provided along with an indication that this virtual brick model was based on a prior virtual brick model. A link 118 to the prior virtual brick model may be provided. Upon selecting link 118, the prior virtual brick model is retrieved from storage device 8 and presented.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer (such as host system 4), or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for generating a virtual brick model, the method comprising:

provi ding access to a virtual brick model application for creating a first virtual brick model;

receiving a first virtual brick model from a computer network and assigning a computer-generated first virtual brick model identifier;

storing a representation of said first virtual brick model along with first virtual brick model information, said virtual brick model information including said first virtual brick model identifier;

providing user access to said virtual brick model application for accessing and editing said first virtual brick model to define a second virtual brick model;

receiving said second virtual brick model from said computer network and assigning a computer-generated second virtual brick model identifier;

storing a representation of said second virtual brick model along with second virtual brick model information, said second virtual brick model information including said second virtual brick model identifier and said first virtual brick model identifier;

presenting said second virtual brick model along with a reference to said first virtual brick model;

wherein said first virtual brick model information includes a first user identifier associated with a first user creating said first virtual brick model.

2. The method of claim 1 wherein:

said creating said first virtual brick model is performed at a first user system and said editing said first virtual brick model is performed at a second user system, different than said first user system.

3. The method of claim 1 wherein:

the first user creates said first virtual brick model and the first user edits said first virtual brick model.

4. The method of claim 1 wherein:

the first user creates said first virtual brick model and a second user edits said first virtual brick model, the second user being different than the first user.

5. The method claim 1 wherein:

said second virtual brick model information includes a second user identifier associated with second user creating said second virtual brick model.

6. The method of claim 1 further comprising:

presenting a link to said first virtual brick model along with said second virtual brick model.

7. A computer program including computer program code stored on a computer readable storage medium for executing by a host system processor to implement a method comprising:

receiving a first virtual brick model from a computer network and assigning a computer-generated first virtual brick model identifier;

storing a representation of said first virtual brick model along with first virtual brick model information, said first virtual brick model information including said first virtual brick model identifier;

providing user access to said virtual brick model application for accessing and editing said first virtual brick model to define a second virtual brick model;

receiving said second virtual brick model from said computer network and assigning a computer-generated second virtual brick model identifier;

storing a representation of said second virtual brick model along with second virtual brick model information, said second virtual brick model information including said second virtual brick model identifier and said first virtual brick model identifier;

presenting said second virtual brick model along with a reference to said first virtual brick model;

wherein said first virtual brick model information includes a first user identifier associated with a first user creating said first virtual brick model.

8. A system for generating a virtual brick model, the system comprising:

a first user system accessing a virtual brick model application for creating a first virtual brick model;

a host system receiving a first virtual brick model from a computer network and assigning a computer-generated first virtual brick model identifier;

said host system storing a representation of said first virtual brick model along with first virtual brick model information, said first virtual brick model information including said first virtual brick model identifier;

a second user system accessing said virtual brick model application for accessing and editing said first virtual brick model to define a second virtual brick model;

said host system receiving said second virtual brick model from said computer network and assigning a computer-generated second virtual brick model identifier;

said host system storing a representation of said second virtual brick model along with second virtual brick model information, said second virtual brick model information including said second virtual brick model identifier and said first virtual brick model identifier;

said host system presenting said second virtual brick model along with a reference to said first virtual brick model;

said host system receiving a request from a user to order said second virtual brick model;

said host system generating said bill of materials for said second virtual brick model from said representation of said second virtual brick model, said bill of materials identifying one of a set of bricks defining an existing model, a brick pack or a list of bricks corresponding to each brick in said second virtual brick model;

said host system initiating distribution of bricks to said user based on said bill of materials.

* * * * *